G. J. KOEHL.
CAN SELECTING AND WEIGHING APPARATUS.
APPLICATION FILED DEC. 11, 1918.
1,343,458.
Patented June 15, 1920.
2 SHEETS—SHEET 2.
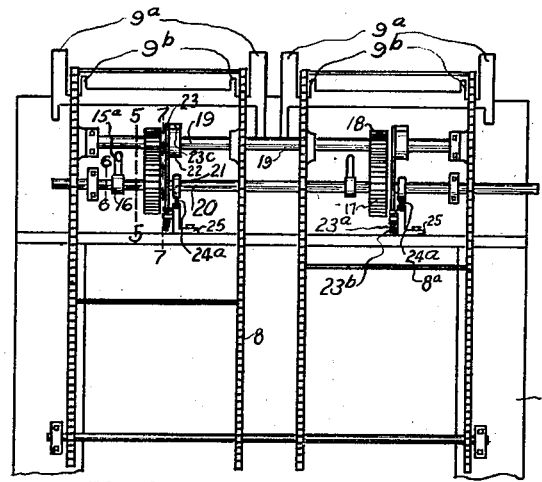
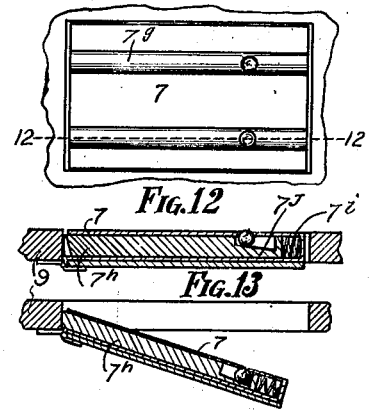
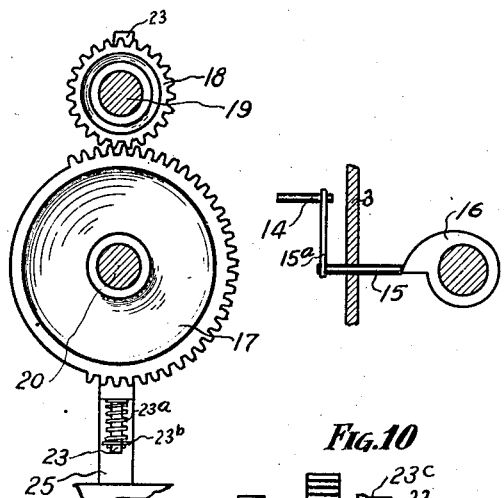
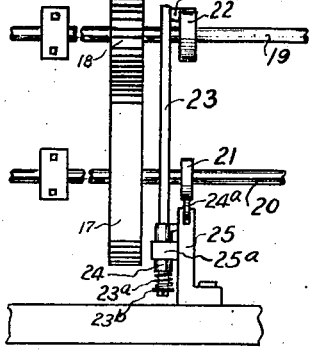
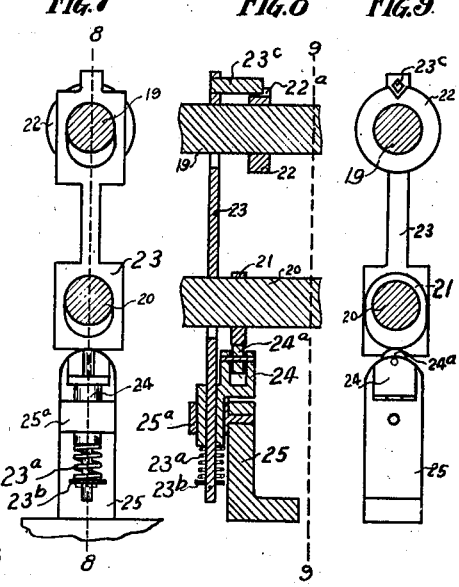
INVENTOR.
GEORGE J. KOEHL.
BY A. B. Bowman
ATTORNEY

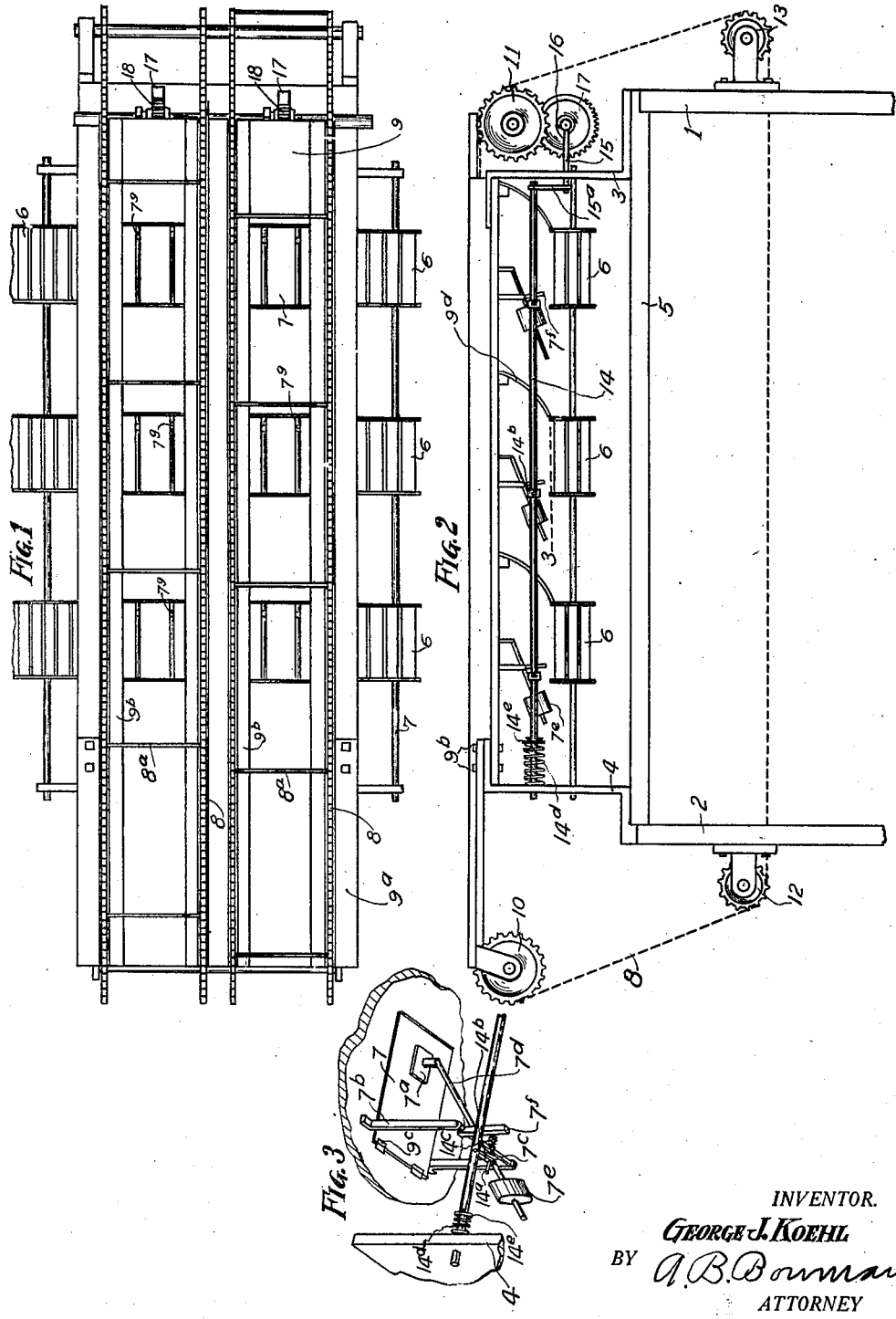

UNITED STATES PATENT OFFICE.

GEORGE J. KOEHL, OF SAN DIEGO, CALIFORNIA, ASSIGNOR TO NEPTUNE SEA FOOD COMPANY, A CORPORATION OF CALIFORNIA.

CAN SELECTING AND WEIGHING APPARATUS.

1,343,458.          Specification of Letters Patent.      Patented June 15, 1920.

Application filed December 11, 1918. Serial No. 266,354.

*To all whom it may concern:*

Be it known that I, GEORGE J. KOEHL, a citizen of the United States, residing at San Diego, in the county of San Diego and State of California, have invented certain new and useful Improvements in Can Selecting and Weighing Apparatus, of which the following is a specification.

My invention relates to an apparatus for selecting miscellaneous articles of different weight into groups of the same weight more particularly adapted for use for selecting different weight cans of fish such as sardines and the objects of my invention are first, to provide an apparatus of this class which selects and distributes cans of fish of several different weights and conveys them into separate groups or receptacles, second, to provide an apparatus of this class which is positive in its action and adjustable throughout, third, to provide an apparatus of this class in which a plurality of balancing devices are used in consecutive order in connection with a conveyer said balancing devices being adjustable for different weights, fourth, to provide a conveyer to be used in connection with said balancing devices that stops the can in a certain position on the balancing device each time, fifth to provide an apparatus of this class with means for preventing breakage and provides for continuing operation in case a can is lodged in one of the balancing devices, and sixth, to provide an apparatus of this class which is simple and economical of construction, durable, automatic in its action and which will not readily deteriorate or get out of order.

With these and other objects in view as will appear hereinafter my invention consists of certain novel features of construction, combination and arrangement of parts and portions as will be hereinafter described in detail and particularly set forth in the appended claims reference being had to the accompanying drawings and to the characters of reference thereon which form a part of this application in which:

Figure 1 is a top or plan view of my device showing two units and showing the conveyers fragmentarily; Fig. 2 is a side elevational view thereof; Fig. 3 is a perspective view of one of the balancing devices in position on a fragmentary portion of its supporting member; Fig. 4 is a front elevational view of the apparatus; Fig. 5 is an enlarged sectional view through 5—5 of Fig. 4; Fig. 6 is an enlarged sectional view through 6—6 of Fig. 4; Fig. 7 is an enlarged sectional view through 7—7 of Fig. 4; Fig. 8 is a sectional view through 8—8 of Fig. 7; Fig. 9 is a sectional view through 9—9 of Fig. 8; Fig. 10 is an enlarged front view of a fragmentary portion of the conveyer operating mechanism; Fig. 11 is a plan view of balancing device platforms in connection with a fragmentary portion of its support; Fig. 12 is a sectional view through 12—12 of Fig. 11 and Fig. 13 is a similar view with the platform dropped at its free side.

Similar characters of reference refer to similar parts and portions throughout the several views of the drawings.

It will be noted that I have illustrated two working units of my apparatus which are adapted to coöperate for increasing the output and that a large number of these units may be added with the same driving mechanism. I will, however, describe only one of said units.

The front support 1, rear support 2, front cross support 3, rear cross support 4, tie members 5, conveyers 6, balancing devices 7, conveyers 8, conveyer support 9, sprockets 10, 11, 12 and 13, balancing device replacing rod 14, rod 15, cam 16, gear 17, pinion 18, shaft 19, shaft 20, cam 21, stop cam collar 22, link member 23, cam wheel support 24, and support member 25 constitute the principal parts of the one unit of my selecting apparatus.

The supports 1 and 2 are bracket supports which extend to the floor and form a base support for the apparatus. Mounted on the top of the support 1 is the cross support 3 and mounted on the top of the support 2 is the cross support 4 and they are tied together by a longitudinal bar 5. Mounted on the top of these supports 3 and 4 and extending from one to the other is a can conductor 9 which is shaped as shown best in Figs. 1, 2 and 4 of the drawings provided with upwardly extending flange members 9ª and with other upwardly extending flange members 9ᵇ spaced some distance therefrom providing guides for the conveyer chains 8 and between these flanges 9ᵇ is the can conductor or guide in which are a plurality of rectangularly shaped holes, in this case I have shown three, which are adapted for the balancing device platform 7 to fit therein. This balancing device platform 7 is hinged to its support 9 by means of hinges 9$^c$ as shown best in Fig. 3 of the drawing. Mounted on the bottom of this plate 7 is a lug 7$^a$ and mounted on opposite sides of the platform 7 and secured to the member 9 are the supports 7$^b$ on the outwardly extending ends of which is pivotally mounted a bar 7$^c$ upon which is secured a lever 7$^d$ the one end of which is pivoted on the lug 7$^a$ and its opposite end is threaded and upon which is screwed a counter balance weight 7$^e$. Also mounted on this bar 7$^c$ is an arm 7$^f$ which extends downwardly and is adapted to be engaged by a pin 14$^a$ which is reciprocally mounted in a lug 14$^b$ secured to the rod 14. This pin 14$^a$ is provided with a spring 14$^c$ adapted to permit the rod 14 to move longitudinally without affecting the balancing device providing something is caught in said balancing device the spring 14$^c$ being compressed in such action. This rod 14 is moved endwise by means of the cam 16 engaging the rod 15 and said rod 15 is connected to the rod 14 by means of a connecting member 15$^a$. This rod 14 is provided with a compression spring 14$^d$ one end of which engages a pin 14$^e$ in said rod and the other end engages the cross support 4 thus tending to hold the rod 14 toward the front end of the apparatus and the rod 15 in engagement with the cam 16.

It will be here noted that this rod 14 is for the purpose of thrusting the balancing device platform 7 back in horizontal position after it has been depressed by the weight of the can passing through the balancing device. It will also be here noted that the weight 7$^e$ may be adjusted on the lever 7$^d$ to provide for the different weight cans so that if the can is lighter than the first balancing device is adjusted for it passes to the second or third one thus selecting the cans which pass through and onto its particular conveyer 6 in accordance with its weight. The conveyer 8 consists of a pair of chains which are mounted on the sprockets 10, 11, 12 and 13 and connecting these two chains are a plurality of bars 8$^a$ which are of the proper height to engage the cans and move them along and these conveyers are operated by the sprockets 11 which are secured on the shaft 19. This shaft 19 is actuated by the shaft 20 which is the main driving shaft, through the gear 17 and pinion 18. This gear 17 is provided with a blank space where there are no teeth so that the shaft 19 stops during a portion of the revolution of the gear 17 and starts again when the gear 17 again engages the pinion 18. In order to provide a positive position for the stop of the conveyer 8 there is provided a cam 21 on the shaft 20 which engages a wheel 24$^a$ in the support 24 which support 24 is mounted on the link member 23 and there is provided a spring 23$^a$ on the lower end of said link member. The one end of said spring engages a washer 23$^b$ which is held on said link member by means of a pin and the other end of said spring engages the lower end of the member 24 thus providing a tension link member actuated by the cam 21 and supported on the shafts 19 and 20 by elongated holes in said link member. The member 24 is reciprocally mounted in an eye bolt 25$^a$ secured in the support 25. Mounted on the upper end of this link member and extending to one side is a lug 23$^c$ which is provided with a wedge shaped lower surface which is adapted to engage a slot 22$^a$ in the member 22 for stopping said shaft 19 in a certain position with each revolution of the shaft 20, thus intermittently operating the conveyer chain as predetermined.

Secured to the member 9 adjacent the free end of the balancing device platform 7 is a chute 9$^d$ adapted to guide the cans from the platform 7 to its particular conveyer 6 after which it is conveyed to the place desired. On the top of the platform 7 are a pair of ridges 7$^g$ each of which is provided with a reciprocating bar 7$^h$ therein the one end of which is adapted to engage the support 9 when the platform 7 is up in a horizontal position as shown in Fig. 12 and to be thrust outwardly by means of a spring 7$^i$ engaging its opposite end when the platform 7 is depressed by the weight of the can. This member 7$^h$ is provided with a beveled portion 7$^j$ in which is mounted a ball which rests in a slight recess caused by said beveled portion so that its upper surface is flush with the upper surface of the ridge 7$^g$ when the member 7 is out of the horizontal position but the upper surface of said ball is raised above the upper surface of said ridge when said bar is up in horizontal position thus forming a positive stop for the can, all as shown best in Figs. 11, 12, and 13.

The rear end of the can conductor 9$^a$ is separable and held in position by the bolts 9$^b$ to provide adjustment and to take up the wear in the chains.

Though I have shown and described a particular construction, combination and arrangement of parts and portions I do not wish to be limited to this particular construction, combination and arrangement but desire to include in the purview of my invention the construction combination and arrangement substantially as set forth in the appended claims.

It is obvious that with this construction there is provided an apparatus by the use of which cans or other articles of varying weights may be selected into groups in accordance with their weights, that the apparatus operates automatically, that there is provided means for delicate adjustment and positive positioning of the cans in their proper relations on each balancing device platform, that there is provided means for stopping the can conveyer in a certain position relative to the balancing device and that the device throughout is positive though flexible enough to prevent breakage or injury.

Having thus described my invention what I claim as new and desire to secure by Letters Patent is:

1. In an apparatus of the class described, the combination of a plurality of balancing devices arranged in a row, a conveyer positioned and arranged to operate over said row of balancing devices, means for intermittently operating said conveyer and other means in connection with said conveyer for positively stopping said conveyer at a certain position relatively to said balancing devices.

2. In an apparatus of the class described, the combination of a plurality of balancing devices arranged in a row, a conveyer positioned and arranged to operate over said row of balancing devices, means for intermittently operating said conveyer, and cam means in connection with said last mentioned means for stopping and positioning said conveyer at a certain pre-determined position relatively to said balancing devices.

3. In an apparatus of the class described, the combination of a plurality of balancing devices arranged in a row, a conveyer positioned and arranged to operate over said row of balancing devices, means for intermittently operating said conveyer, and means positioned on each of said balancing devices for stopping the article to be weighed in a certain position on said balancing device.

4. In an apparatus of the class described, the combination of a plurality of balancing devices arranged in a row, a conveyer positioned and arranged to operate over said row of balancing devices, means for intermittently operating said conveyer, means in connection with said last mentioned means for stopping said conveyer at a certain pre-determined position relatively to said balancing devices, and means in connection with each of said balancing devices for stopping the article to be weighed in a certain position on said balancing device.

5. In an apparatus of the class described, a supporting frame, a can conveyer operatively mounted on said supporting frame, means for intermittently operating said can conveyer, a plurality of hinged platforms in certain spaced relation under said conveyer, a lever pivotally connected to each of said platforms, a fulcrum for said lever, a counter balance adjustably mounted on the opposite end of said lever and means actuated by the means for intermittently operating said conveyer engaging said fulcrum member for positioning said plate in a horizontal plane with said support when out of such position.

6. In an apparatus of the class described, a supporting frame, a can conveyer operatively mounted on said supporting frame, means for intermittently operating said can conveyer, a plurality of hinged platforms in certain spaced relation under said conveyer, a lever pivotally connected to each of said platforms, a fulcrum for said lever, a counterbalance adjustably mounted on the opposite end of said lever, means actuated simultaneously with said conveyer engaging said fulcrum member for positioning said plate in a horizontal plane with said support, and means for stopping said conveyer at a certain pre-determined point relatively to said hinged platform.

7. In an apparatus of the class described, a supporting frame, an endless chain conveyer arranged in operative relation over said supporting frame, a plurality of balancing devices arranged in a row below a portion of said conveyer, means for adjusting said balancing devices whereby the various weights of articles stopped on said balancing devices will depress the same and the article pass through the supporting frame, a cam actuated means for re-positioning said balancing devices and means for intermittently operating said conveyer.

8. In an apparatus of the class described, a supporting frame, an endless chain conveyer arranged in operative relation over said supporting frame, a plurality of balancing devices arranged in a row below a portion of said conveyer, means for adjusting said balancing devices whereby the varying weights of articles stopped on said balancing devices will depress the same and the article pass through the supporting frame, a cam actuated means for re-positioning said balancing devices, means for intermittently operating said conveyer comprising a driving shaft, a driven shaft parallel therewith, a partially blank gear secured on said driven shaft, a pinion meshing therewith on said driven shaft and means on said driven shaft for engaging and operating said conveyer.

9. In an apparatus of the class described, a supporting frame, an endless chain conveyer arranged in operative relation over said supporting frame, a plurality of balancing devices arranged in a row below a portion of said conveyer, means for adjusting said balancing devices whereby the varying weights of articles stopped on said balancing devices will depress the same and the article pass through the supporting frame, a cam actuated means for re-positioning said balancing devices, means for intermittently operating said conveyer, comprising a driving shaft, a driven shaft parallel therewith, a partially blank gear secured on said driven shaft, a pinion meshing therewith on said driven shaft, means on said driven shaft for engaging said conveyer, means for stopping said conveyer at a certain relative position to said balancing devices comprising a cam on said driven shaft, a link member operated by said cam, with its one end supported by said driven shaft provided with a wedge shaped lug adjacent said driven shaft extending parallel therewith and a collar cam secured to said shaft with a V shaped notch therein adapted to be engaged by said lug whereby said driven shaft is revolubly shifted to a certain position.

In testimony whereof, I have hereunto set my hand at San Diego, California this 3d day of December 1918.

GEORGE J. KOEHL.